(12) United States Patent
DiSanto et al.

(10) Patent No.: US 7,289,101 B1
(45) Date of Patent: Oct. 30, 2007

(54) MULTI-COLOR ELECTROPHORETIC IMAGE DISPLAY

(75) Inventors: Frank J. DiSanto, North Hills, NY (US); Denis A. Krusos, Lloyd Harbor, NY (US); Wei-Hsin Hou, Seatauket, NY (US)

(73) Assignee: Copytele, Inc., Melville, NY (US)

( * ) Notice: Subject to any disclaimer, the term of this patent is extended or adjusted under 35 U.S.C. 154(b) by 0 days.

(21) Appl. No.: 09/640,514

(22) Filed: Aug. 17, 2000

(51) Int. Cl.
  *G09G 3/34* (2006.01)
(52) U.S. Cl. ........................... 345/107; 345/105
(58) Field of Classification Search ................ 345/107, 345/105, 48; 359/296
  See application file for complete search history.

(56) References Cited

U.S. PATENT DOCUMENTS

| | | | |
|---|---|---|---|
| 3,612,758 A * | 10/1971 | Evans et al. ............. | 315/169.3 |
| 3,668,106 A * | 6/1972 | Ota ............................ | 358/305 |
| 4,655,897 A | 4/1987 | DiSanto et al. | |
| 4,732,830 A | 3/1988 | DiSanto et al. | |
| 4,742,345 A | 5/1988 | DiSanto et al. | |
| 4,746,917 A | 5/1988 | DiSanto et al. | |
| 4,772,820 A | 9/1988 | DiSanto et al. | |
| 5,041,824 A | 8/1991 | DiSanto et al. | |
| 5,254,981 A | 10/1993 | DiSanto et al. | |
| 5,315,312 A | 5/1994 | DiSanto et al. | |
| 5,360,689 A | 11/1994 | Hou et al. | |
| 5,460,688 A | 10/1995 | DiSanto et al. | |
| 5,467,107 A | 11/1995 | DiSanto et al. | |
| 5,467,217 A * | 11/1995 | Check et al. ............... | 359/296 |
| 5,498,674 A | 3/1996 | Hou et al. | |
| 5,561,443 A | 10/1996 | DiSanto et al. | |
| 5,587,242 A | 12/1996 | Hou et al. | |
| 5,627,561 A | 5/1997 | Laspina et al. | |
| 5,739,946 A * | 4/1998 | Iwanaga et al. ............ | 204/450 |
| 5,745,094 A | 4/1998 | Gordon, II et al. | |
| 5,872,552 A | 2/1999 | Gordon, II et al. | |
| 5,896,005 A | 4/1999 | Gurvitch et al. | |
| 5,961,804 A | 10/1999 | Jacobson et al. | |
| 6,271,823 B1 * | 8/2001 | Gordon et al. ............. | 345/107 |
| 6,639,580 B1 * | 10/2003 | Kishi et al. ................ | 345/107 |

FOREIGN PATENT DOCUMENTS

JP  01211735 A  *  8/1989

OTHER PUBLICATIONS

Alec Klein; Will the Future Be Written in E-Ink?; Wall Street Journal; Marketplace; Jan. 4, 2000; p. B2-B4.
English translation of Patent Abstracts of Japan, publication No. 01-211735, Aug. 24, 1989.

* cited by examiner

*Primary Examiner*—Sumati Lefkowitz
*Assistant Examiner*—Ke Xaio
(74) *Attorney, Agent, or Firm*—Plevy, Howard & Darcy, PC

(57) ABSTRACT

A color electrophoretic display including a plurality of cells each containing electrophoretic particles. Each of the cells in the plurality is capable of displaying at least one of three selected primary colors, when the particles in the cell are moved from a first rest position to a second display position on the cell. An electrode is coupled to each of the cells and is operative when biased to move the particles from the first rest position to the second display position thereby displaying primary colors in the second display position and causing the display to provide full color capability according to particle position in the cells.

2 Claims, 12 Drawing Sheets

MULTI-COLOR ELECTROPHORETIC IMAGE DISPLAY

FIELD OF THE INVENTION

This invention relates to electrophoretic image displays and, more particularly, to a multi-color electrophoretic image display.

BACKGROUND OF THE INVENTION

The electrophoretic effect is well known in the art as evidenced by the many patents and articles which describe this effect. In essence, the electrophoretic effect operates on the principle that when certain particles are electrically charged to a particular polarity, the charged particles will migrate away from a surface charged to the same polarity as the particles and toward a surface charged to a polarity which opposite to that of the charged particles. For example, particles which are positively charged will migrate away from a positively charged surface and towards a negatively charged surface.

Display devices which utilize the electrophoretic effect are commonly known as electrophoretic image displays (EPIDs). EPIDs are very well known in the art. The following patents issued to Frank J. Disanto and Denis A. Krusos, and assigned to Copytele, Inc., the assignee herein, are illustrative of such EPIDs.

U.S. Pat. No. 4,655,897 entitled ELECTROPHORETIC DISPLAY PANELS AND ASSOCIATED METHODS, describes an electrophoretic display apparatus comprising an XY matrix of grid and cathode lines, an anode electrode spaced from the grid and cathode matrix, and an electrophoretic dispersion. The patent describes techniques for making such displays as well as suitable dispersions for use with such displays.

U.S. Pat. No. 4,732,830 entitled ELECTROPHORETIC DISPLAY PANELS AND ASSOCIATED METHODS, describes methods for making electrophoretic displays as well as describing display construction and operation.

U.S. Pat. No. 4,742,345 entitled ELECTROPHORETIC DISPLAY PANEL APPARATUS AND METHODS THEREFOR, describes improved electrophoretic display panels exhibiting improved alignment and contrast with circuitry for implementing the same as well as methods for providing such a panel.

U.S. Pat. No. 4,746,917 entitled METHOD AND APPARATUS FOR OPERATING ELECTROPHORETIC DISPLAYS BETWEEN A DISPLAY AND A NON-DISPLAY MODE, describes various biasing techniques for operating electrophoretic displays to provide writing, erasing as well as operating the display during a display and non-display mode.

U.S. Pat. No. 4,772,820 entitled MONOLITHIC FLAT PANEL DISPLAY APPARATUS, describes methods and apparatus for fabricating flat panel displays employing electrophoretic principles to enable such displays to be biased and driven by additional circuitry.

The electrophoretic fluids used in EPIDs typically comprise white, light, or dark colored dielectric particles which are suspended in an optically contrasting fluid medium which is either clear or dark-colored, depending upon the color of the particles. See U.S. Pat. No. 5,360,689 entitled COLORED POLYMERIC DIELECTRIC PARTICLES AND METHOD OF MANUFACTURE, issued to Hou et al., which describes black electrophoretic and light-colored electrophoretic particles formed from crystalline polymer particles using a dispersion polymerization technique. In accordance with the electrophoretic effect described above, the electrophoretic particles in the suspension liquids are caused to selectively migrate to, and impinge upon, a transparent screen electrode, thereby displacing the fluid medium from the screen and creating the desired image.

EPIDs have many advantages over other types of flat panel displays. One advantage is that EPIDs use materials which are relatively inexpensive and thus, makes them less costly to manufacture. Another advantage of EPIDs is that the image formed on the screen remains even when power is removed. When the electrophoretic particles or dye particles are caused to move to form an image, the image will not erase and remains on the display even upon removing of power. Hence the image must be erased in the same manner as it was created, by application to the device of an electric field of opposite polarity. Thus, EPIDs have a built-in memory in the sense that the images created by the displays do not have to be refreshed such as those images produced by CRT's and other types of displays.

One drawback associated with most prior art electrophoretic displays is that they are monochromatic. This drawback severely limits the number of applications where EPIDs can be employed. Accordingly, there is a need for a multi-color EPID which is capable of reliable operation and which is economical to fabricate.

SUMMARY OF THE INVENTION

A color electrophoretic display comprising a plurality of cells each containing electrophoretic particles. Each of the cells in the plurality is capable of displaying at least one of three selected primary colors, when the particles in the cell are moved from a first rest position to a second display position on the cell. An electrode is coupled to each of the cells and is operative when biased to move the particles from the first rest position to the second display position thereby displaying primary colors in the second display position and causing the display to provide full color capability according to particle position in the cells.

BRIEF DESCRIPTION OF THE DRAWINGS

The advantages, nature, and various additional features of the invention will appear more fully upon consideration of the illustrative embodiments now to be described in detail in connection with accompanying drawings, wherein.

It should be understood that the drawings are for purposes of illustrating the concepts of the invention and are not to scale.

DETAILED DESCRIPTION OF THE INVENTION

Figure 1A:
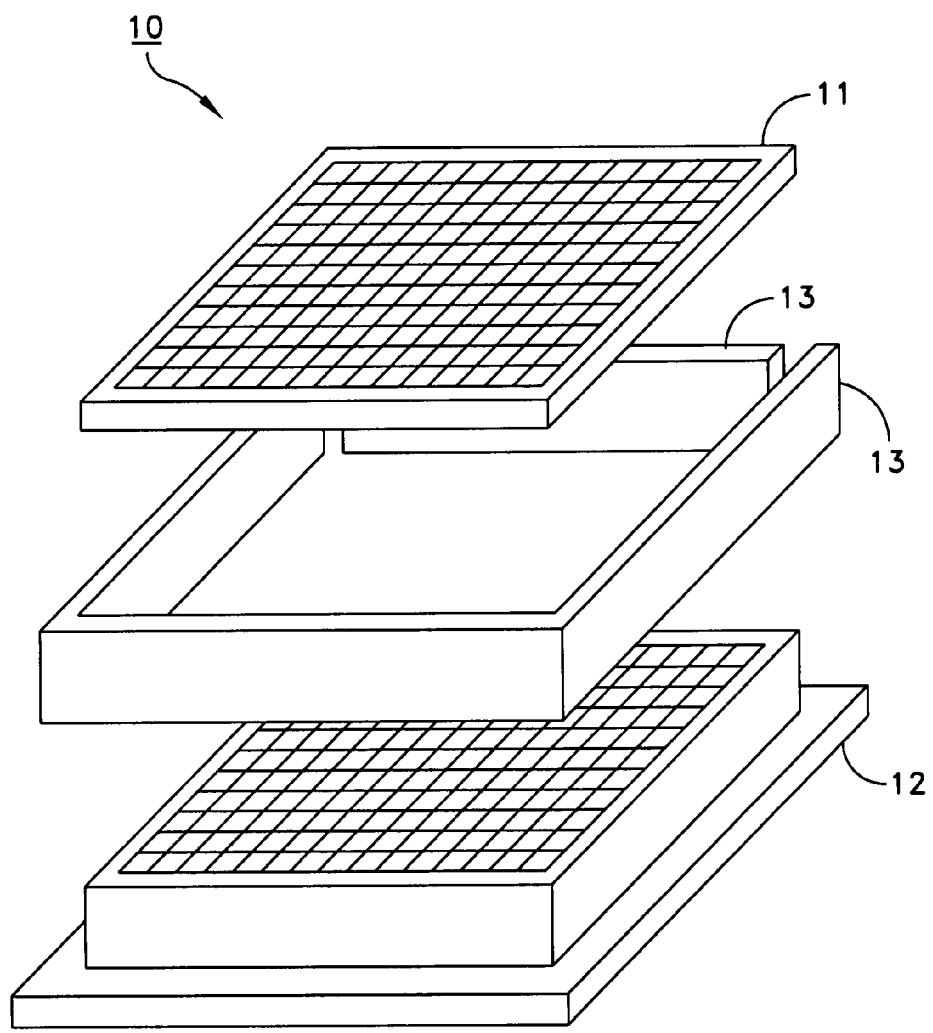
FIG. 1A is an exploded perspective view of a multi-color electrophoretic image display (EPID) according to a first embodiment of the invention.
Figure 1B:
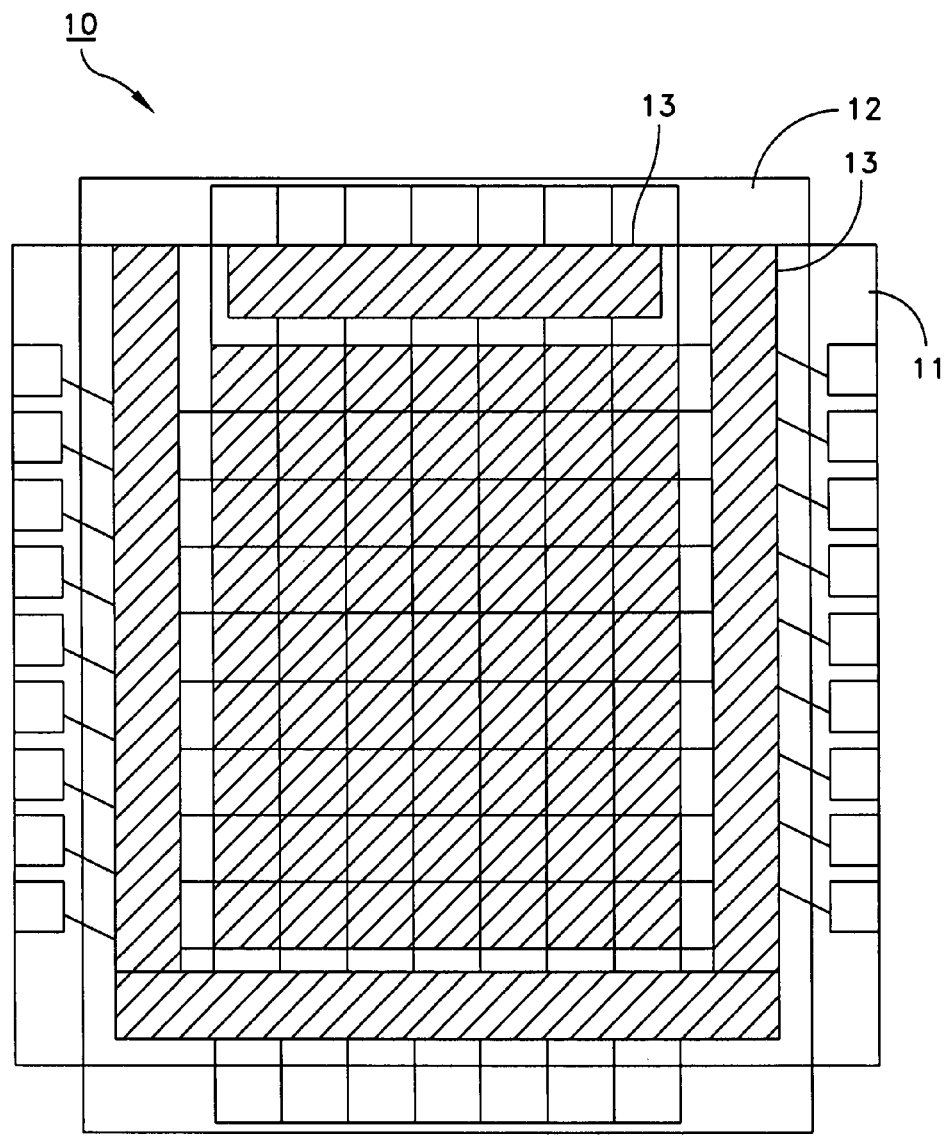
FIG. 1B is a front elevational view of the multi-color EPID illustrated in FIG. 1A.

FIGS. 1A and 1B collectively show a multi-color electrophoretic image display (EPID) 10 according to a first embodiment of the invention. The EPID 10 comprises a pair of parallel electrodes 11, 12 sealingly assembled together with spacers 13 to form a liquid and gas sealed enclosure having a small space S between the electrodes 11, 12 (FIG. 4), and an electrophoretic fluid 14 filling the space S between the electrodes. The electrophoretic fluid 14 is conventional, comprising a dielectric liquid of a dark color, such as a blue or red, having suspended therein millions of polymer/pigment composite dielectric particles 16 (electrophoretic particles 16) of a light color, such as white or yellow, which can be charged in accordance with known techniques. The EPID 10 is typically rectangular in shape, although other geometrical configurations can be employed as well.

Figure 2A:
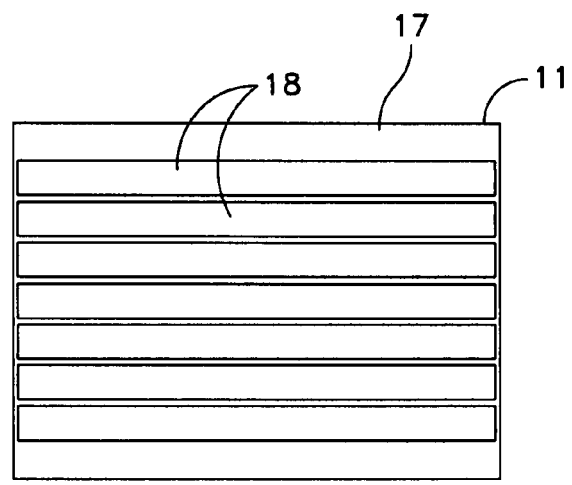
FIG. 2A is an elevational view of an anode used in the EPID of the invention illustrating anode lines formed on the inner surface of the anode.

Electrode 11, referred to hereinafter as anode 11, is constructed from a generally planar sheet of transparent plastic or glass. As shown in FIG. 2A, the anode 11 includes parallel rows of electrically conductive, transparent electrode or anode lines 18 on an inner surface 17 thereof. The anode lines 18 are typically fabricated by depositing a thin (about 300 Angstroms in thickness) transparent layer of conductive material, such as indium-tin-oxide (ITO), on the inner surface of the sheet and selectively etching the layer to form the anode lines. This can be accomplished using conventional thin-film deposition and etching techniques.

Figure 2B:
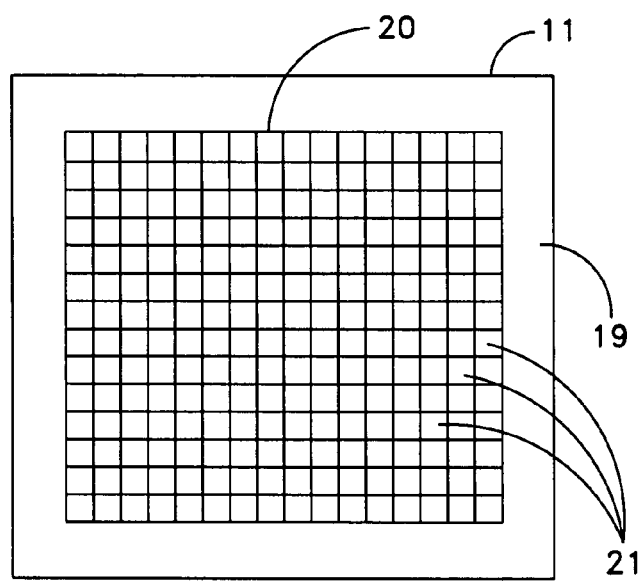
FIG. 2B is an elevational view of the anode illustrating a color filter array formed on the outer surface of the anode.
Figure 2C:
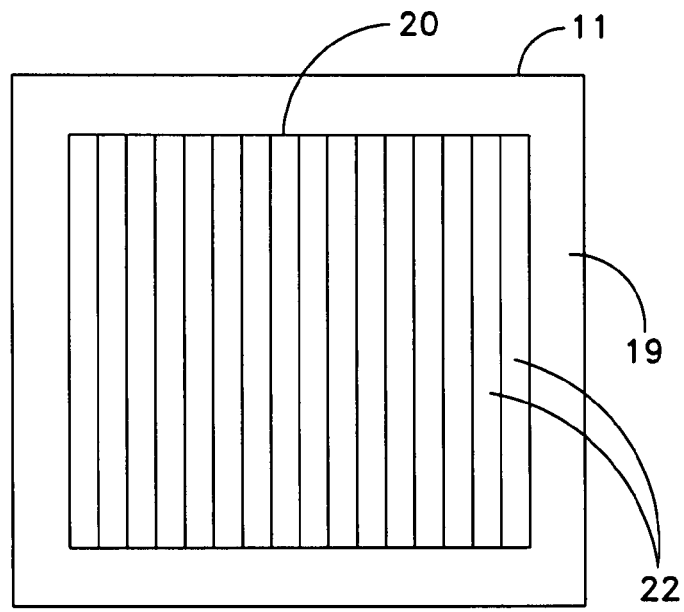
FIG. 2C is an elevational view of the anode illustrating an alternate color filter array design formed on the outer surface of the anode.

As shown in FIG. 2B, a multi-color light filter array 20 is provided on an outer surface 19 of the anode 11. The light filter array 20 can include a two dimensional array of red, blue, and green colored filters 21. The filters 21 are typically fabricated using conventional printing or lamination techniques. Alternatively as shown in FIG. 2C, the light filter array 21 can be constructed as alternating rows of red, blue, and green colored filters 22. The filters 21 are typically colored plastic presenting primary colors red, green and blue. As is well known, such colors can provide all colors of the spectrum, as in conventional color displays.

Figure 3A:
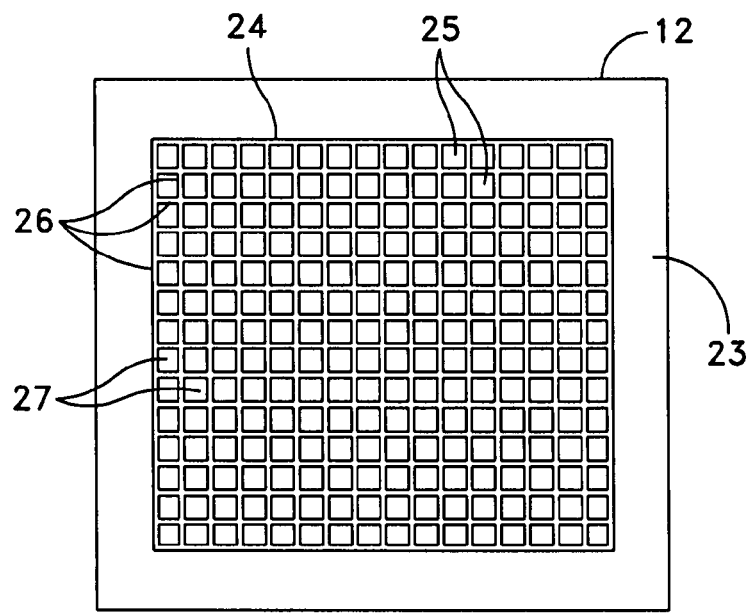
FIG. 3A is an elevational view of a cathode used in the EPID of the invention illustrating a two dimensional array of cells formed on the inner surface of the cathode.

Electrode 12, referred to hereinafter as cathode 12, is constructed from a generally planar sheet of plastic or glass. As shown in FIG. 3A, the inner surface 23 of the cathode 12 defines a two dimensional array 24 of cells 25 which resembles an egg-crate structure. Each cell 25 of the array includes one or more side walls 26 (four side walls 26 are illustrated in the embodiment of FIG. 3A) which project generally perpendicularly from the inner surface 23 of the cathode 12. The floor of each cell includes an electrode pad 27 formed by a coating of an electrically conductive material such as ITO. The electrode pads 27 can be deposited using conventional semiconductor deposition techniques.

Figure 4:
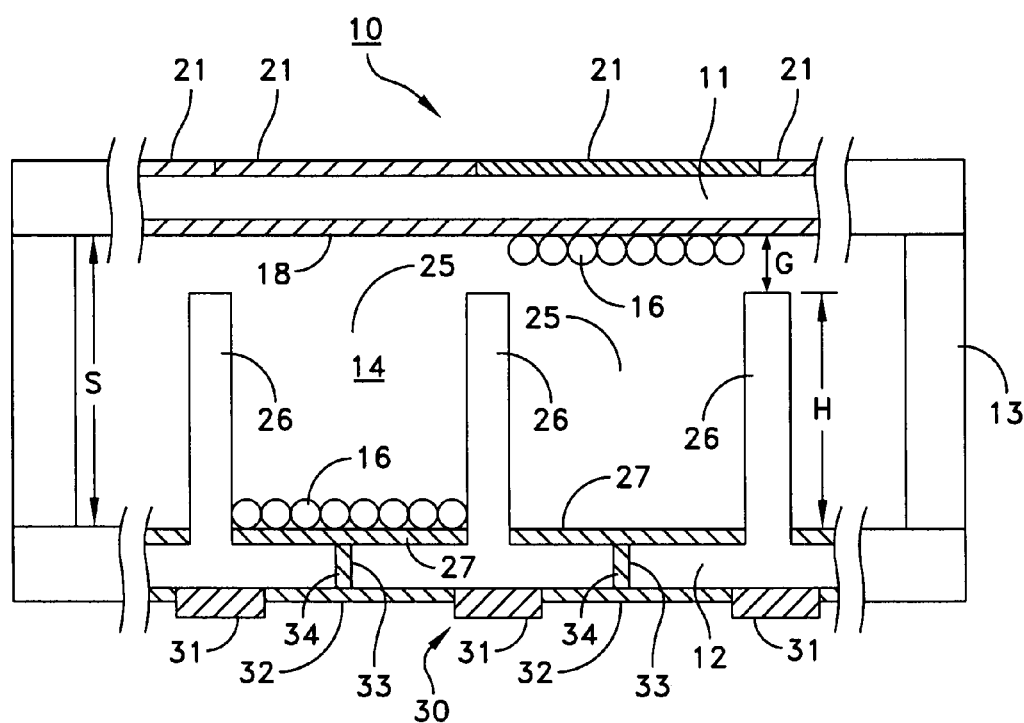
FIG. 4 is a cross-sectional view through the EPID of the first embodiment of the invention.

As shown in the cross-sectional view of FIG. 4, each cell 25 of the array 24 is filled with a portion of the electrophoretic fluid 14 and a corresponding portion of the electrophoretic particles 16 dispersed therein, and is operative as one pixel cell for imaging. The cells 25 tend to isolate the electrophoretic particles 16 from each other, therefore, significantly improving the electrical, colloidal, operational, and life-time stability of the EPID 10. Moreover, the cells 25 can be easily dimensioned to provide hundreds of pixels per inch, thereby enabling one to obtain extremely fine resolution, hence creating high resolution display capabilities which exceed the resolution of present commercially available display.

Figure 3B:
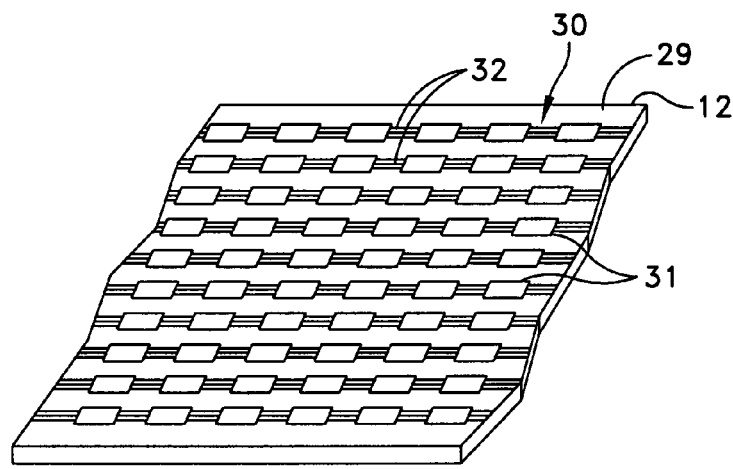
FIG. 3B is a perspective view of a segment of the cathode illustrating an integrated circuit for driving the pixel cells formed on the outer surface of the cathode.

As shown in FIG. 3B, an integrated circuit 30 for driving the pixel cells 25 is formed on an outer surface 29 of the cathode 12. The drive circuit 30 is conventional in design and operation and includes a plurality of diode or transistor amplifiers 31 which are interconnected by electrically conductive lines 32 made for example from ITO. The drive circuit 30 can be fabricated on the outer surface 29 of the cathode 12 using well known integrated circuit manufacturing techniques.

As shown in the cross-sectional view of FIG. 4, an electrically conductive through-hole or via 33, extends through the cathode and electrically connects the electrode pad 27 of each cell 25 to one of the wires 32 of the drive circuit 30 formed on the outer surface 29 of the cathode 12, thereby permitting each cell 25 to be electrically driven. As one of ordinary skill in the art will recognize, by applying proper biasing potentials on the respective amplifiers 31, a biasing potential is created between the anode and cathode 11, 12 which will cause the electrophoretic particles 16 in any cell 25 to move between the anode and the cathode 11, 12 in accordance with the electrophoretic effect. For example, if the electrophoretic particles 16 are initially disposed in their associated cells 25 of the cathode 12 (adjacent from corresponding positions on the anode lines 18) attracted there by their charge, which is opposite to the applied voltage, reversal of the sign of the applied voltage will cause these particles 16 to move to their corresponding positions on the anode lines 18 of the anode 11. If the electrophoretic particles 16 are initially disposed on the anode lines 18 of the anode 11 (adjacent their associated cells 25) attracted there by their charge, which is opposite to the applied voltage, reversal of the sign of the applied voltage will cause these particles 16 to move to their associated cells 25 of the cathode 12.

Figure 5A:
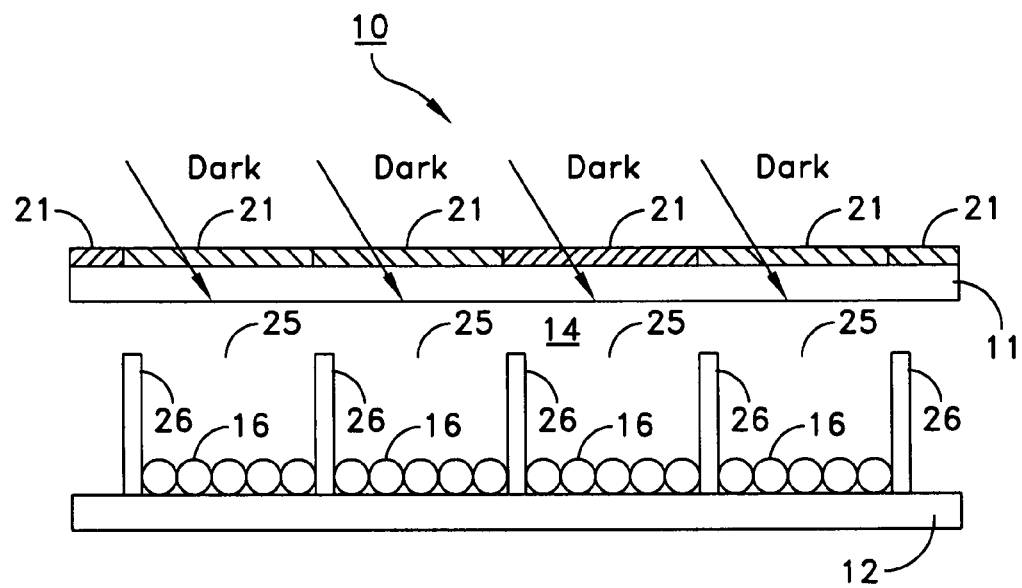
FIGS. 5A and 5B are cross-sectional views through the EPID of the first embodiment of the invention illustrating the operation thereof.
Figure 5B:
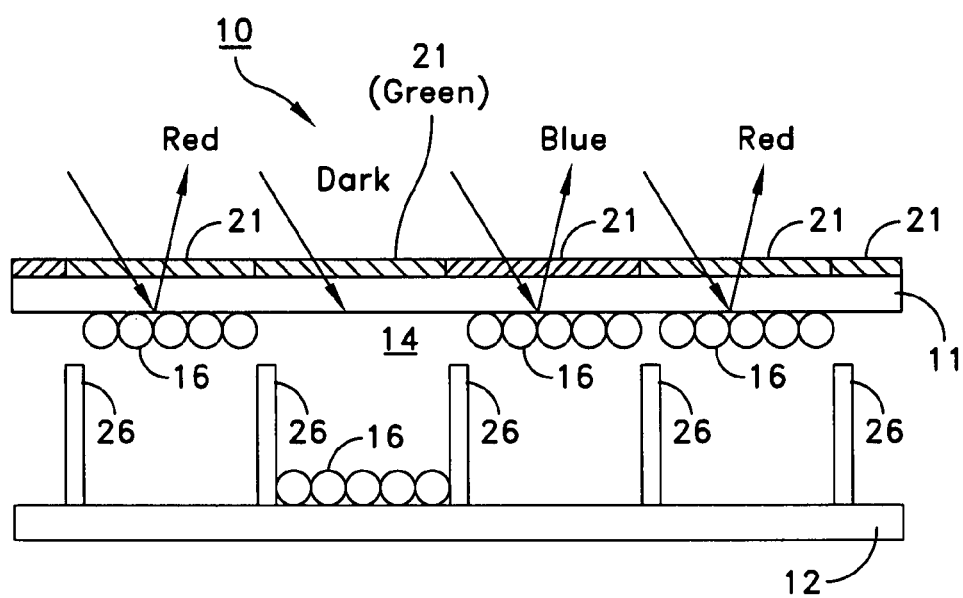

As shown in FIGS. 5A and 5B, when the electrophoretic particles 16 within each cell 25 are electrically driven to a corresponding position on the anode lines 18 of the anode 11 where they remain, the particles 16 on the anode 11 generate a reflective surface thereunder that reflects incoming light passing through each cell's 25 respective color filter 21 to produce red, blue, and green light. By combining the appropriate number of cells 25 producing red, blue, and green light, a multi-color image can be produced including multi-color alpha numeric characters or graphics, such as television pictures.

Referring again to FIG. 4, the spacers 13 are sealed to the inner surfaces of the anode and cathode 11, 12 around the perimeter of the display using conventional sealing methods. The spacers 13 have a thickness T which is at least 1 mil thicker than the height. H of the cell walls 26 which creates a gap G between the inner surface 17 of the anode 11 and the free edges of the cell walls 26. This gap G permits the electrophoretic fluid 14 to flow into and fill up each cell 25 of the cathode 12 when the EPID 10 is filled with the fluid 14.

Figure 6:
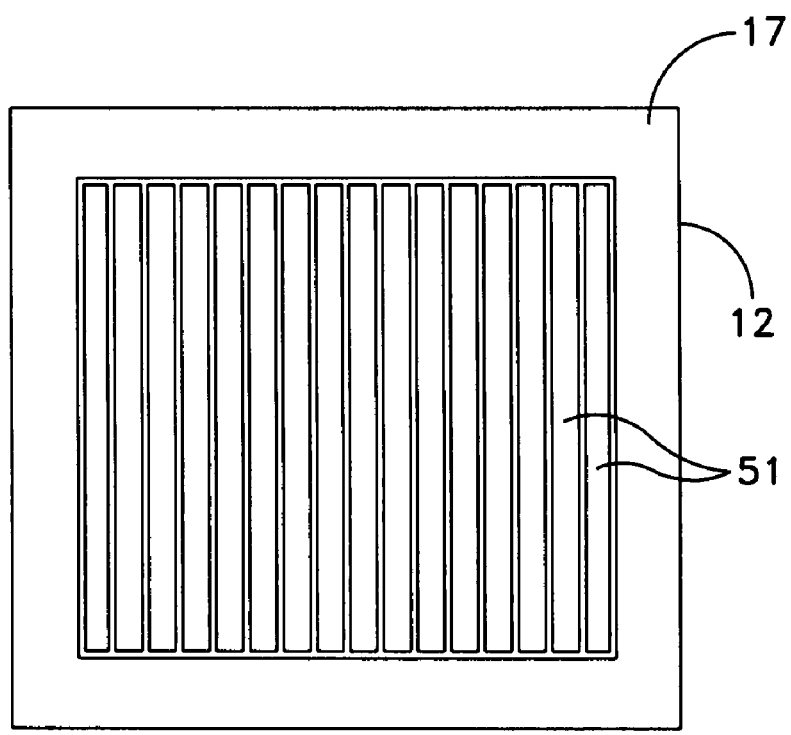
FIG. 6 is an elevational view illustrating the cathode of an EPID according to a second embodiment of the invention.

In a second embodiment of the EPID of the invention, the inner surface 23 of the cathode 12, as shown in FIG. 6, defines parallel rows 51 of elongated cells instead of an egg-crate structure as in the first embodiment. Each elongated cell 51 operates as a line or row pixel. The light filter array (not shown) used in this embodiment can be constructed as described in FIG. 2C with alternating lines of red, blue, and green colored filters, each of which operates as a light filter for a corresponding one of the cells 51.

Figure 7A:
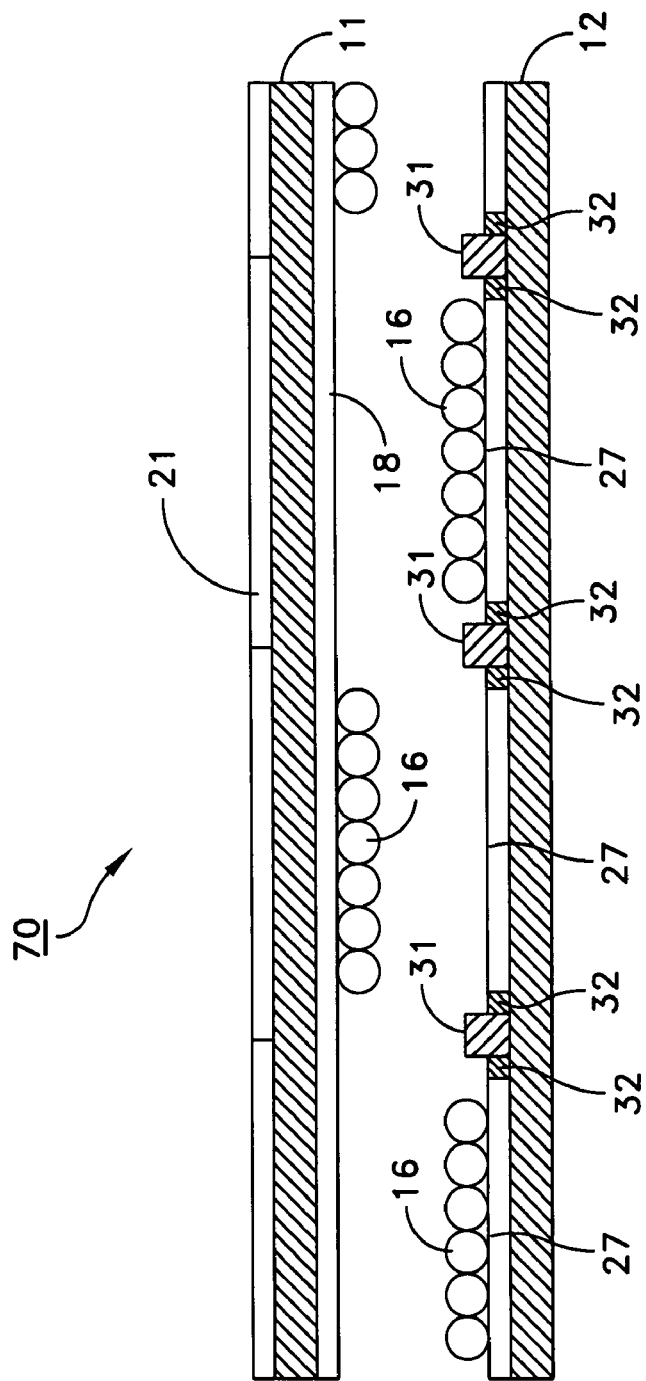
FIG. 7A is a cross-sectional view illustrating an EPID according to a third embodiment of the invention.
Figure 7B:
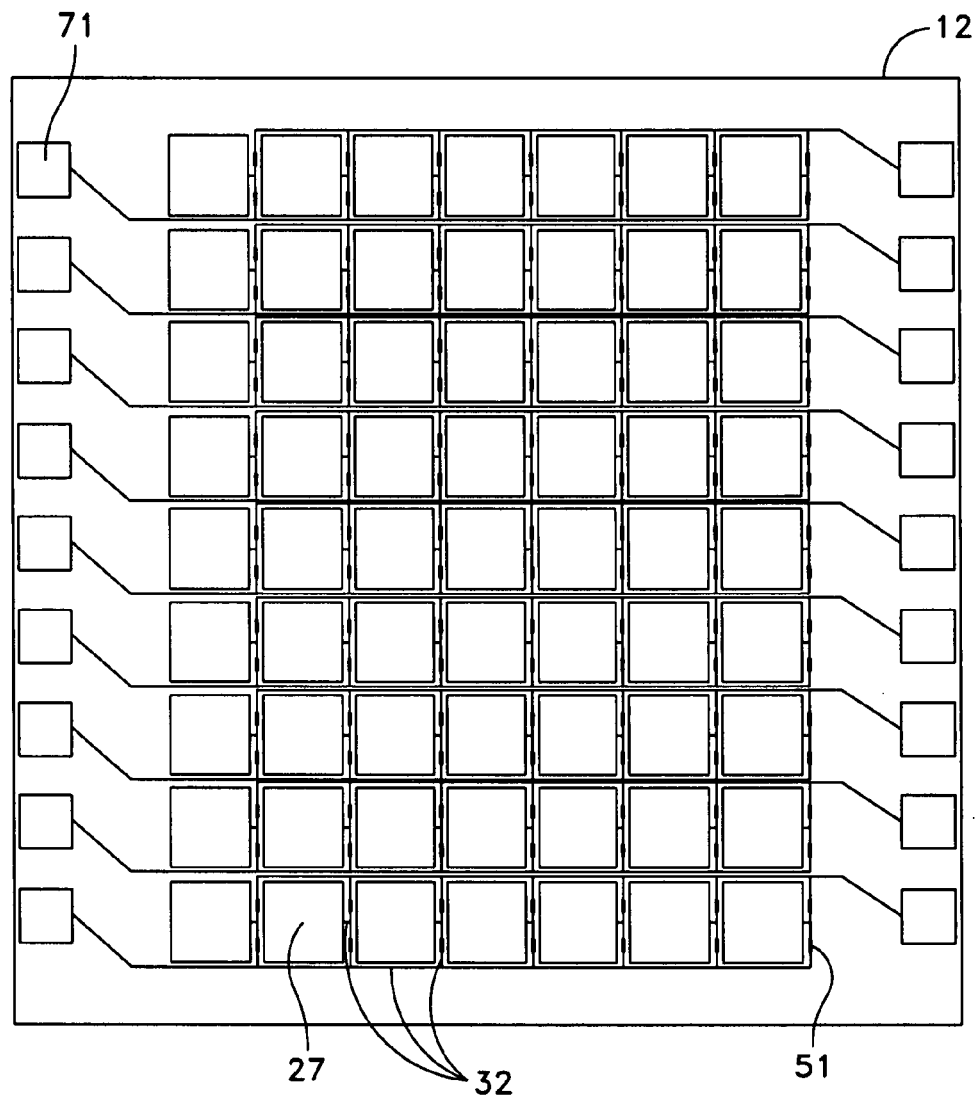
FIG. 7B is an elevational view illustrating the cathode of the EPID of FIG. 7A.
Figure 7C:
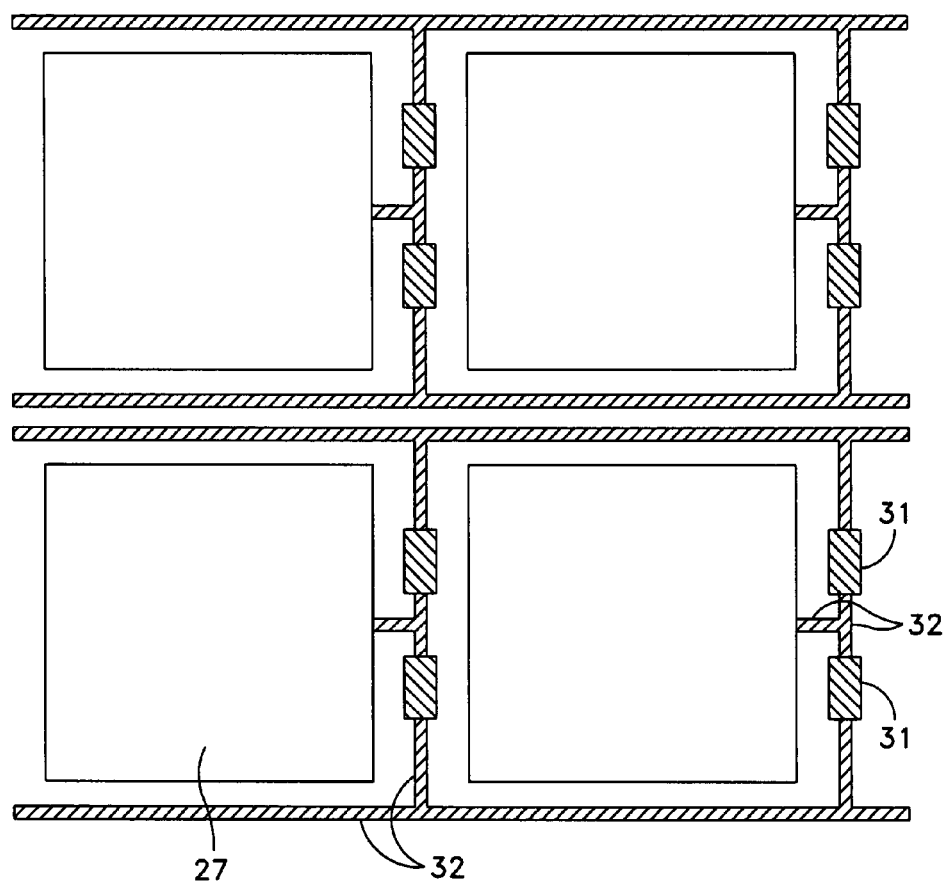
FIG. 7C is an enlarged view of the cathode shown in FIG. 7B.

FIGS. 7A-7C collectively illustrate the EPID 70 according to a third embodiment of the invention. In this embodiment, the cathode 12 essentially omits the cell side walls which project from the inner surface 23 thereof in the previous embodiments. This allows the drive circuit 30, TO which includes the electrically conductive metal lines 32 that electrically interconnect the diodes or transistors 31 disposed between the pixels, to be formed on the inner surface 23 of the cathode 12 along with the electrode pads 27 so that the electrically conductive through-holes used in the previous embodiments can be eliminated. Electrically conductive contact pads 71, which connect the drive diodes or transistors 31 to a driver chip, are also formed on the inner surface 23 of the cathode 12 adjacent opposing edges of the cathode 12.

Figure 8A:
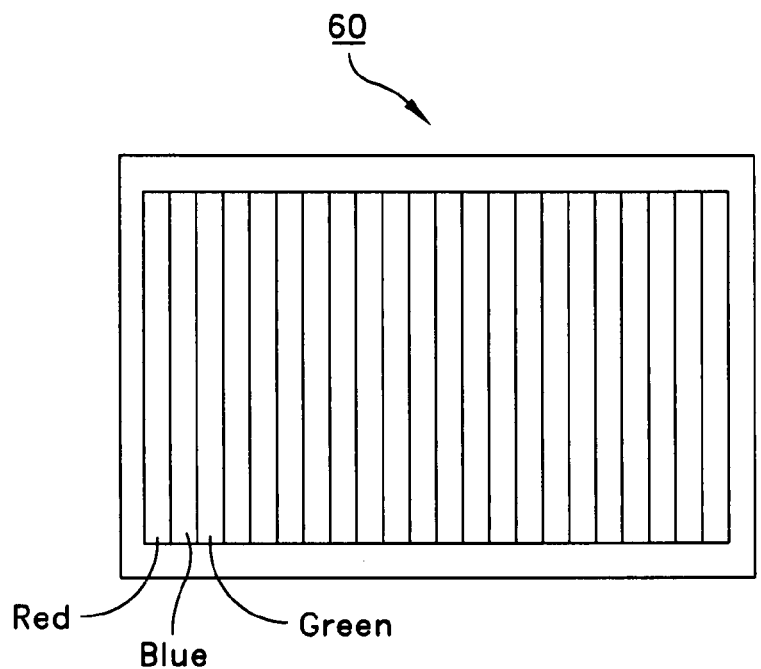
FIG. 8A is a front elevational view of an EPID according to a fourth embodiment of the invention.
Figure 8B:
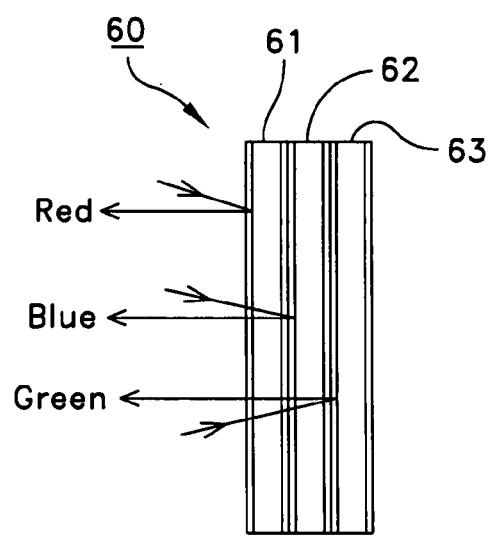
FIG. 8B is a side elevational view of the EPID of the fourth embodiment of the invention.
Figure 8C:
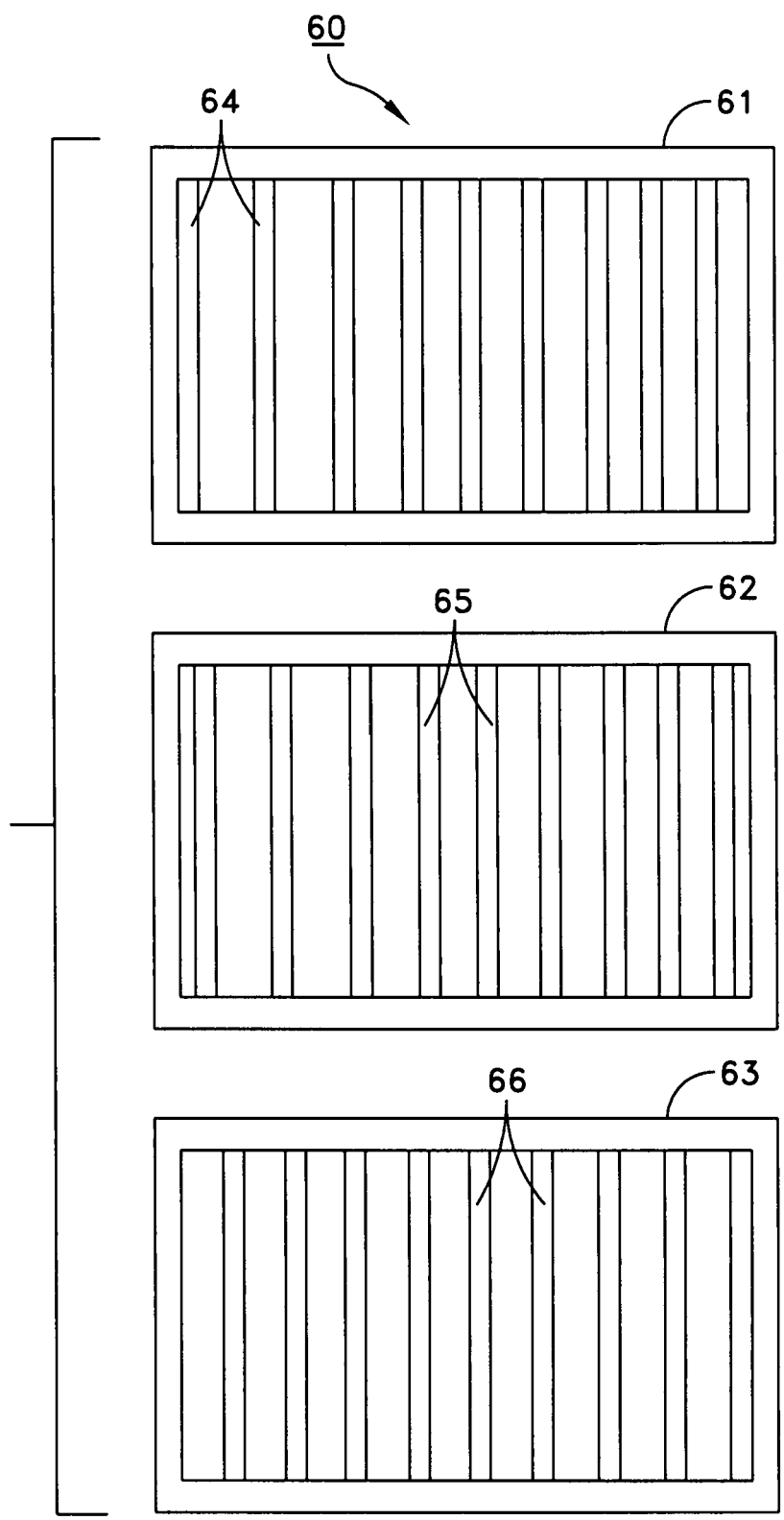
FIG. 8C is an exploded view of the EPID of the fourth embodiment of the invention.

FIGS. 8A-8C collectively illustrate an EPID 60 according to a fourth embodiment of the invention. In this embodiment, the EPID 60 is constructed by combining three individual EPIDs 61, 62, 63 together in a face-to-face manner. The front, middle, and rear EPIDs 61, 62, 63 can be constructed essentially as described above in the previous embodiments, but without the filter arrays. Each EPID 61, 62, 63 contains electrophoretic particles preferably of one of the primary colors red, blue, and green. For example, EPID 61 can contain red particles, EPID 62 can contain blue particles, and EPID 63 can contain green particles. Thus, the front EPID 61 displays only red light, the middle EPID 62 displays only blue light, and the rear EPID 63 displays only green light.

Further, the cells or pixels 64, 65, 66 of the EPIDs 61, 62, 63 are oriented so that the light produced by the cells or pixels 65, 66 of the middle and rear EPIDs 62, 63 can be view through the front EPID 61. This can be accomplished, as shown in FIG. 8C, by spacing apart the cells or pixels 64, 65, 66 in each of the EPIDs 61, 62, 63 and by aligning the cells 64, 65, 66 of the front, middle, and rear EPIDs 61, 62, 63 in an offset manner. Additionally, both of the electrodes in at least the front and middle EPIDs 61, 62, 63 are constructed from transparent plastic or glass sheets and employ transparent electrode lines and electrode pads.

In operation, the EPID 60 combines the appropriate number of red, blue, and green cells 64, 65, 66 from the front, middle, and rear EPIDs 61, 62, 63 to produced a multi-color image which is viewed through the front EPID 61.

While the foregoing invention has been described with reference to the above embodiments, various modifications and changes can be made without departing from the spirit of the invention. Accordingly, all such modifications and changes are considered to be within the scope of the appended claims.

What is claimed is:

1. A multi-color electrophoretic image display comprising:
    pixels of at least two different colors, the pixels defined by electrophoretic particle-containing cells each having adjacent side-walls being formed on a first electrode, and
    a second transparent electrode, separated from said first electrode by a spacer such that the electrophoretic particle-containing cells are in fluid communication with one-another,
    wherein the electrophoretic particles, in selected ones of the cells, are partially confined by the side-walls and electrophoretically movable to and from adjacent positions on said transparent second electrode and reflect light entering the display; and light reflected from one of the cells is a different color than light reflected from an adjacent one of the cells.

2. The display according to claim 1, wherein the transparent second electrode includes a multi-color light filter array that filters and thereby colors light reflected by the electrophoretic particles.

* * * * *